June 14, 1960  G. L. WALLACE  2,940,679
TIRE RACK AND SPREADER APPARATUS
Filed Oct. 7, 1957
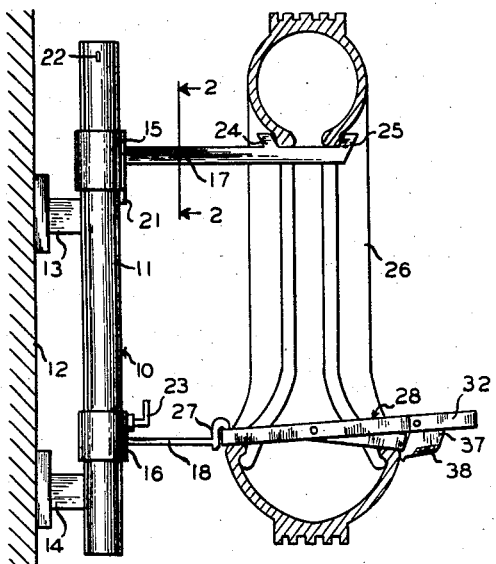
FIG. 1
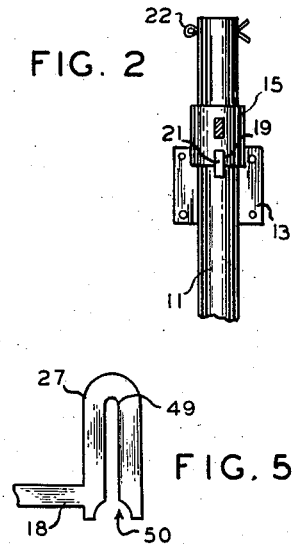
FIG. 2
FIG. 5
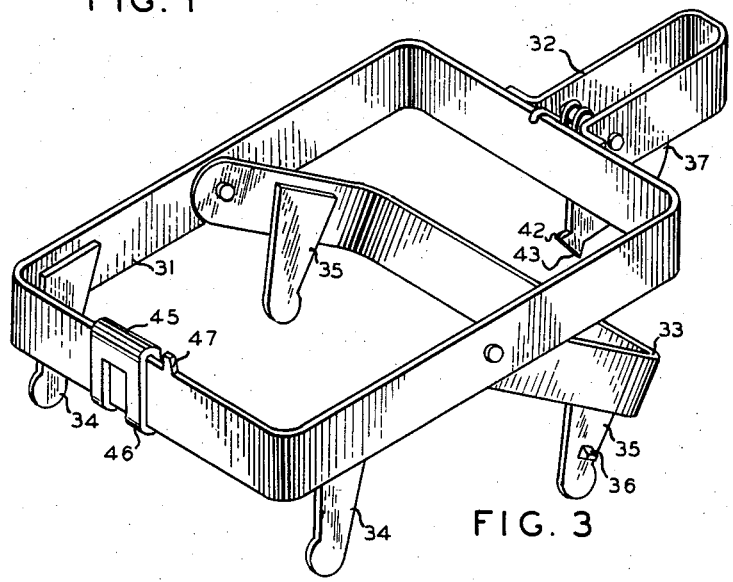
FIG. 3
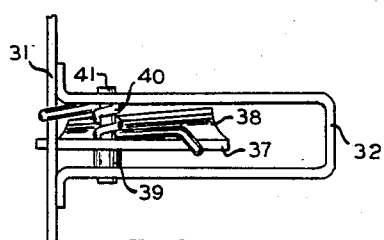
FIG. 4
INVENTOR.
GENERAL L. WALLACE
BY
ATTORNEY

United States Patent Office 2,940,679
Patented June 14, 1960

2,940,679

TIRE RACK AND SPREADER APPARATUS

General L. Wallace, P.O. Box 124, Bowersville, Ga.

Filed Oct. 7, 1957, Ser. No. 688,454

5 Claims. (Cl. 254—50.4)

This invention relates to a tire rack and spreader apparatus for use in connection with pneumatic tires and more particularly for use in connection with the inspection and repair of pneumatic tire casings.

When the interior of a pneumatic tire casing is to be inspected or repaired, it is often necessary to spread the tire beads so that an unobstructed inspection and repair area can be presented. It is, in addition, advantageous to have the tire casing supported at a convenient level for the performance of such inspection and repair operations, so as to minimize the effort involved. Devices heretofore devised to facilitate internal inspection of tire casings have for the most part been large, heavy, complicated and cumbersome, frequently consisting of permanently located massive equipment. Usually such prior art devices engage the tire at ground level requiring the operator to bend or stoop for the inspection and so positioning the casing as to preclude adequate natural illumination.

One of the objects of my invention, therefore, is to provide a novel and improved tire rack and spreader apparatus for spreading and holding apart the beads of a tire casing while at the same time supporting the casing at a convenient level for inspection and repair.

Another object of the present invention is to provide an apparatus of the type referred to which is simple in construction and operation and light in weight so as to be readily portable and easily supported in elevated position.

It is also an object of my invention to provide a tire rack for use in connection with the inspection and repair of tire casings which can be arranged to occupy a minimum of space when not in use or extended for use with minimum effort to present the device in a convenient location for operation.

A further object of my invention is to provide a tire rack and spreader apparatus constructed and arranged of few parts, readily operable with minimum effort and one which lends itself to the demands of economic manufacture.

Numerous other objects, features and advantages of the present invention will be apparent from a consideration of the following specification taken in conjunction with the accompanying drawings.

In accordance with the objects of my invention, a tire rack and spreader apparatus is provided in which the rack portion thereof generally comprises a vertically mounted post having upper and lower collars slidable thereon and rotatable thereabout. The upper collar carries an outwardly projecting arm having spaced upwardly extending fingers at its outer end which are adapted to engage the rim edges or beads of a tire casing to be hung from the arm in a substantially vertical plane. The lower collar is selectably locatable on the post and carries an outwardly extending lower arm having a hook arrangement at its outer end.

The tire spreader apparatus of my invention comprises a generally rectangular main frame having a handle formed at one end thereof. In addition, the main frame has a U-shaped swinging frame pivotally connected thereto, which is provided with, along with the main frame, a pair of tire bead engaging jaws or elements. The frames are adapted to be releasably locked in a spread or fully extended position. When the tire spreader is engaged with a tire casing, so supported on the rack as described, the hook arrangement provided at the outer end of the lower arm is adapted to engage the end member of the main frame of the spreader opposite the handle thereon. In this manner, it can be seen that with the tire casing firmly supported on the rack, the interaction of the tire spreader and the rack so operates upon the tire casing so as to provide an unobstructed inspection and/or repair area at a convenient level for operation thereupon. It is further apparent from the foregoing that the provision of slidable and rotatable collars on the post allows for the turning aside of both the upper and lower arms so as to require a minimum storage space for the rack apparatus when not in use and to allow maximum use of the general area in which the rack is mounted.

For a more complete understanding of my invention, reference is now made to the following description in connection with the accompanying drawing, wherein like reference characters refer to the same or similar parts throughout the several views, and in which:

Fig. 1 is a side elevation of my tire rack and spreader assembly in operative engagement with a tire casing shown in cross section;

Fig. 2 is a detail cross section taken along the line 2—2 of Fig. 1;

Fig. 3 is a perspective view of the tire spreader of my invention;

Fig. 4 is a detail fragmentary view illustrating the latch mechanism of the tire spreader of my invention;

Fig. 5 is a detail fragmentary view illustrating the engaging arrangement at the end of the lower arm.

Referring now more particularly to Figs. 1 and 2, the tire rack and spreader apparatus of my inveniton as shown therein comprises a rack member generally designated as 10, having a vertical post 11 fixedly secured to a wall, or other suitable supporting structure 12, by brackets 13 and 14. Slidably secured to the vertical post as by collars 15 and 16 are upper and lower horizontal arms 17 and 18, respectively. The collar 15 is provided with a keyslot 19 that receives the post key 21 to maintain the upper arm 17 rigidly normal to the supporting structure 12 when the rack is set up for operation. When the rack is not in use, the collar 15 can be raised on the post 11 so as to disengage the key 21 from the keyslot 19, thereby allowing the arm 17 and collar 15 to be rotated about the post toward the wall 12. Cotter pin 22 is provided through the top of the post 11 to limit the upward movement of the collar 15.

The lower collar 16 is provided with anchor screw 23 so as to allow the lower arm 18 to be readily adjusted to a proper vertical height depending on tire casing size, as hereinafter explained, and further, to allow the lower arm to be rotated about the post toward the wall 12.

It will be appreciated that by the adjustable arrangement of the upper and lower arms, the space required for the rack when not in use can be minimized.

The upper arm 17 is provided along the upper edge thereof with spaced inclined fingers 24 and 25, extending inwardly and outwardly, respectively, at an angular relation of about 60 degrees with the arm 17. These fingers are adapted to engage the rim edges or beads of a tire casing 26 which is thereby supported in a generally vertical plane, substantially parallel to the plane of the wall 12. The lower arm 18 is provided with an inverted U-type hook 27 at the outer end thereof which engages the tire casing spreader 28, hereinafter described in detail with respect to Fig. 5.

Referring now particularly to Figs. 3 and 4, the tire spreader shown therein comprises a generally square main frame 31 having a handle 32 welded or otherwise fixedly secured to one end thereof. A generally U-shaped swinging frame 33 is pivotally connected at the free ends of its respective side portions to the mediate portions of the opposite sides of the main frame 31 by rivets or other suitable means. Tire bead engaging elements, such as jaws 34, are spot welded or otherwise secured to the sides of the main frame 31 at the end thereof distant from the U-shaped handle 32. A second pair of jaws 35 are secured in a similar manner to the sides of the swinging frame 33 near the closed end thereof. It is further contemplated that one of the jaws 35 be provided with an outwardly projecting lug, as at 36, which is adapted to abut the jaw 34 so as to limit the relative inward movement of the frames. It will be apparent from this construction that when the jaws 34 and 35 are inserted between the beads of a tire casing, the jaws cooperate, as the handle 32 is forced downwardly, to spread the beads apart, thereby permitting unobstructed and convenient access to the interior of the expanded portion of the casing.

Pivotally mounted between the sides of the handle 32 is a depending dog member 37 having a return-bent under portion 38 that functions as a finger-grip. The dog is centered between the sides of the handle by spacer collar 39 and spring 40 which are disposed on either side of the dog 37 and held in line therewith by pivot pin 41 which passes through the handle 32. The dog 37 is further provided with a latching projection 42 having a sloping portion 43 adapted to function as a cam edge cooperating with the closed end of the swinging frame to force the dog 37 outwardly. As is apparent from this construction, the locking operation is completed as the dog 37 is urged inwardly by spring 40 for engagement of the latching projection 42 under the closed end of the swinging frame 33 so as to lock the spreader in fully extended position. To release the tire spreader from locked-open position, application of pressure to the finger grip area 38 will rotate the dog 37 in a counterclockwise direction, thereby delatching the swinging frame 33 and allowing the tire casing to return to its normal configuration.

The end member of the main frame opposite the handle 33 is provided with slide bar 45 secured by arms, as at 46, extending thereunder. Lug 47 on the end member is provided to limit the inward movement of the slide bar, so that when the slide bar is in abutting relation thereto it will be approximately in the center of the end member. The top of the slide bar is rounded for complementary registration with the hook at the end of the lower rack arm, as will hereinafter be described.

Referring now to Fig. 5, it can be seen that the hook arrangement there shown may be characterized as an inverted-U member 27 of approximately the same width as the slide bar 45 and defining a slot 49 of such dimension as to snugly receive the end member of the main frame of the spreader for purposes as will hereinafter be described. At the bottom of the inverted-U hook, the slot terminates in a generally cylindrical mouth 50. It will be recognized from this arrangement that when the slide bar is centered on the end member of the spreader, the top of the slide is adapted for complementary registration with the mouth of the slot, and when the slide is moved to the side, the end member of the spreader is adapted for full insertion into the slot.

It will be appreciated from the foregoing description that the tire rack and spreader apparatus of my invention can be used with considerable flexibility. For example, the tire casing may first be supported on the upper arm member of my invention, having the spreader with slide bar in center position loosely engaged with both the tire casing and the mouth of the inverted U-hook of the lower arm member. The spreader may then be operated to expand the casing so as to present convenient access to the interior thereof. Upon the finding of a portion in need of repair, the slide bar may then be moved out of center position, permitting the slot in the hook of the lower arm to fully engage the end member of the spreader to effect securement of the spreader for the repair operation. In this manner of usage, the lower arm hook arrangement provides for securing the tire casing for the spreading, inspecting and repairing operations.

As one of the alternative methods of application of the rack and spreader apparatus of my invention, after the tire casing has been inspected and a damaged area has been found, the tire casing with spreader locked thereon may then be supported from the upper arm of the rack member, with the lower arm so adjusted that the slot of the hook fully engages the main frame of the spreader at the end thereof distant from the handle. The casing would then be firmly held at a convenient operator level for repair of the damaged area.

As an additional feature of my invention, when the rack and spreader apparatus is not in use, provision is made for turning both the upper and lower arm members out to the side so as to allow maximum use of the general area in which the rack is mounted.

From the foregoing it will be apparent that I have provided a novel tire rack and spreader apparatus which is well adapted to fulfill the aforesaid objects of the invention. Moreover, whereas the invention has been disclosed in particularity with respect to an embodiment which gives satisfactory results, it will be understood by those skilled in the art to which the invention most nearly appertains, that additional embodiments and modifications thereof may be provided without departing from the spirit or scope of my invention as defined in the appended claims.

I claim:

1. Apparatus for use in connection with the inspection and repair of a tire casing, including a tire rack and tire spreader, said rack including a post, means to vertically mount said post, upper and lower arms, an upper collar rotatably and slidably supported on said post and carrying said upper arm, said upper arm adapted to support said tire casing in a substantially vertical plane, a lower collar supported on said post and carrying said lower arm, said lower arm including tire spreader engaging means having an inverted U-shaped hook, means for selectively positioning said lower collar on said post, said tire spreader being releasably engageable with said tire casing and with said engaging means.

2. Apparatus for use in connection with the inspection and repair of a tire casing, including a tire rack and tire spreader, said rack including a post, means to vertically mount said post, upper and lower arms, an upper collar rotatably and slidably supported on said post and carrying said upper arm, said upper arm adapted to support said tire casing in a substantially vertical plane, a lower collar supported on said post and carrying said lower arm, said lower arm including tire spreader engaging means defining a downwardly opening slot having an enlarged mouth portion, means for permitting selective positionig of said lower collar on said post, said tire spreader being releasably engageable with said tire casing and with said engaging means.

3. Apparatus for use in connection with the inspection and repair of a tire casing, including a tire rack and tire spreader, said rack including a post, means to vertically mount said post, upper and lower arms, an upper collar rotatably and slidably supported on said post and carrying said upper arm, said upper arm adapted to support said tire casing in a substantially vertical plane, a lower collar supported on said post and carrying said lower arm, said lower arm including tire spreader engaging means defining a downwardly opening slot having an enlarged mouth portion, means for permitting selective positioning of said lower collar on said post, said tire spreader, including a selectively positionable slide bar, being releasably engageable with said tire casing and said engaging means.

4. A rack for use in connection with a tire spreader to aid in the inspection and repair of tire casings, comprising a post, means to mount said post in an upright position, upper and lower collars supported on said post, and upper and lower arms carried by said upper and lower collars, respectively, said upper arm including tire bead engaging means and said lower arm including tire spreader engaging means having a downwardly opening slot with an enlarged mouth portion.

5. A tire spreader for use in connection with the inspection and repair of tire casings comprising a generally rectangular main frame having side and end members, a swinging frame pivotally connected to the side members of said main frame, a first pair of tire bead engaging elements carried by said main frame, a second pair of tire bead engaging elements carried by said swinging frame, a handle formed on one end member of said main frame, releasable means pivoted to said handle adapted to lock said main and swinging frames in fully extended position including a spring urged dog having a finger grip portion extending under said handle, and a selectively positionable slide bar provided on the other end of said main frame.

References Cited in the file of this patent

UNITED STATES PATENTS

| | | |
|---|---|---|
| 1,638,997 | Hopkins | Aug. 16, 1927 |
| 1,811,284 | Sords | June 23, 1931 |
| 1,907,007 | Robertson | May 2, 1933 |
| 1,964,602 | Schumacher | June 26, 1934 |
| 2,032,295 | Mehnert | Feb. 25, 1936 |